April 21, 1931.   L. C. AMENT   1,801,464
HOLDER FOR LIPSTICKS AND THE LIKE
Filed Feb. 16, 1929

INVENTOR:
Lucy Cotton Ament,
BY Spear, Middleton, Donaldson + Hall
ATTORNEYS

Patented Apr. 21, 1931

1,801,464

UNITED STATES PATENT OFFICE

LUCY COTTON AMENT, OF NEW YORK, N. Y., NOW BY JUDICIAL CHANGE OF NAME LUCY COTTON THOMAS

HOLDER FOR LIP STICKS AND THE LIKE

Application filed February 16, 1929. Serial No. 340,609.

My present invention relates to a holder for sticks of crayon nature, such as lipsticks, sticks of cold cream, menthol or the like.

An object of the invention is the provision of a holder for lipsticks or the like embodying novel means for effectively closing the open end of the holder when the lipstick is not in use.

Another object is to provide a closure for the end of the lipstick holder which while providing a complete and effective closure is readily operable to open the same for immediate use, with one hand only.

A further object is the provision of hooded hinged doors for protecting the exposed end of the lipstick and defining its proper amount of protrusion.

Other objects will appear hereinafter from the description, drawings and appended claims.

The invention consists in the features, combination and arrangement of parts hereinafter described and particularly pointed out in the claims.

Figure 1:
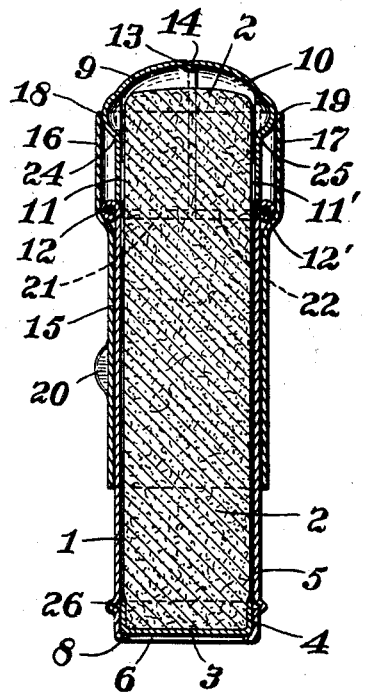
Fig. 1 represents a vertical sectional elevation of my lipstick holder with the lipstick therein and the parts in closed position.
Figure 2:
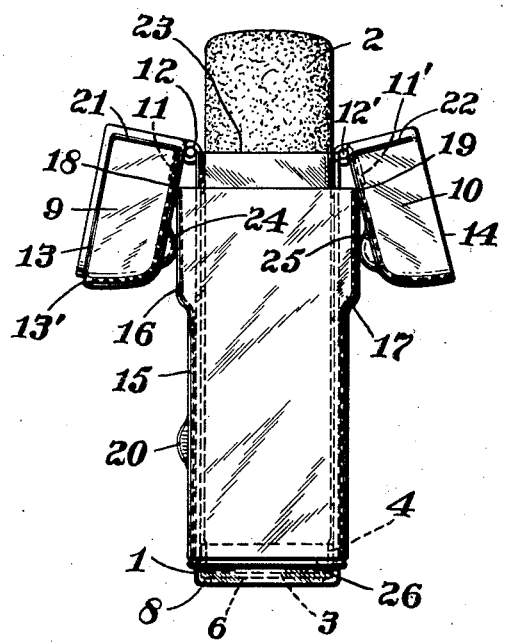
Fig. 2 is a side elevation of the holder of my invention showing the actuating or operating sleeve in withdrawn position and the closure members swung outwardly to open position.
Figure 3:
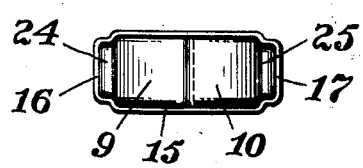
Fig. 3 is a top plan view of the holder as shown in Fig. 1 in closed position.

Referring to the drawings, 1 represents the casing for the lipstick 2 or the like which is slidable longitudinally thereof. The casing 1 is provided with a movable bottom 3 having an annular flange 4 in closed frictional engagement with the inner wall 5 of the casing, and movable upon application of pressure through the open bottom end 6 of the casing to move and adjust the stick as needed, but sufficiently tight to hold the stick in adjusted position for use.

The casing wall 1 at the lower edge is provided with an inturned flange 8 forming a terminal abutment stop for the movable bottom member 3 of my improved holder device.

The bottom member 3 with its annular upstanding flange 4 provides a recess or receptacle for the lower end of the stick 2.

It will be apparent that refill sticks may be readily inserted in and removed from the movable bottom member, though it may be found desirable on account of the low cost of manufacturing the cup shaped bottom member to provide each refill stick 2 with the bottom member 3.

At the upper end of the casing 1 are mounted hinged closure members or doors 9 and 10 adapted to meet centrally of the open upper end to effect the closure and cap or hood shaped to completely cover the projecting end 11 of the stick 2. The doors or closure members 9 and 10 are urged to open position by springs 11 and 11' mounted at their hinges 12 and 12'.

Figure 4:
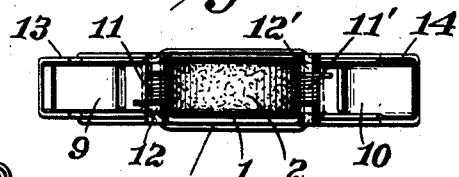
Fig. 4 is a top plan view of the holder and stick as shown in Fig. 2 in open position.
Figure 5:
Fig. 5 is a fragmental section at right angles to Fig. 1, showing the engagement of the sleeve and doors when in closed position.

The doors or hinged hoods 9 and 10 are preferably arranged with their meeting edges 13 and 14 in overlapping relation as shown in Figs. 1 and 4, the meeting edge 13 of the hooded door 9 being bent downwardly and inwardly to project beneath the meeting edge 14 of the hooded closure member 10, and to provide an abutment shoulder at 13'. It will be apparent that the meeting edges could be arranged to meet without overlapping, if desired, but the arrangement shown is preferred.

A closure operating sleeve 15 surrounds and is frictionally mounted for sliding movement upon the casing 1.

All portions of the sleeve 15 are disposed to engage the wall of the casing 1 with the exception of portions 16 and 17, which are disposed in slightly raised or slightly protruding relation with respect to the remainder of the sleeve wall and in slightly spaced relation with respect to the casing wall. In the drawings this space and raised relation are exaggerated for the sake of clearness, it being apparent that the hinges can be made much smaller than as shown. The upper edges 18 and 19 of the portions 16 and 17 are adapted upon being moved upwardly or forwardly over the hinges 12 and 12' to push the doors or hoods 9 and 10 toward closed position, the edges 18 and 19 engaging the gradual slope of the walls of the hooded doors 9 and 10 and causing the doors to meet as described.

A raised button 20 may be provided in any suitable manner upon the sleeve 15 to aid in manipulation of the same with one hand. This is preferably pressed from the metal as shown or may comprise a button of ornamental nature secured to the wall of the sleeve.

The operation of my improved lipstick holder will be clear from the above description. When not in use, the holder is in closed position as shown in Fig. 1, the sleeve being pushed forwardly over the hinges 12 and 12' and engaging the doors 9 and 10 to effect the closure of the meeting edges of the doors and maintaining them in meeting or closed position, with the lower edges 21, 22 of the doors 9 and 10 engaging the upper edge 23 of the casing and the edges 13 and 14 in meeting overlapping relation.

When it is desired to use the lipstick, the stick is pushed upward in the holder as far as it will go by pushing against the movable bottom 3, and the sleeve 15 is then withdrawn, allowing the doors to fly open by the action of the springs at their hinges, and the stick is then exposed to the proper extent for use.

The walls 24 and 25 of the doors are so shaped as to provide a gradual incline for frictional engagement by the upper edges 18 and 19 of portions 16 and 17 and are shaped to permit the doors to swing down well out of the way of the stick and against the sleeve.

The doors or hoods are of sufficient height to provide when open, for ample protrusion of the lipstick, and the lipstick should not be pushed out to extend beyond this point as the doors will then not close until it is pushed inwardly again.

I also preferably provide a limiting abutment rib 26 on the casing to prevent downward removal of the sleeve from the casing.

Thus the hoods or doors of my invention provide an effective protecting means for the lipstick by covering the same when not in use, and preventing likelihood of breakage in use by limiting protrusion of the stick from the casing.

The effective and readily operable closure means enables the holder and stick to be easily closed and dropped into a bag containing articles which would be damaged by contact with the lipstick.

With my arrangement it is made easy to remember to close the holder after use, since the open doors are a reminder, and desirable compactness for carriage is effected by a simple sliding movement.

I do not wish to limit myself to the exact shape of holder device and lipstick, as it will be understood that my invention may be used in connection with any shape of lipstick without departing from the spirit of my invention.

The lipstick could be used without the movable bottom member 3 without departing from the scope of my invention, in which case the lipstick would engage directly with the terminal flange of the casing to limit its downward movement.

I claim:

1. In combination, a tubular casing, swinging closure means reaching above said casing a sufficient distance to permit a usable portion of the contents of the casing to be projected beyond its upper edge and against the closure means, and means whereby said contents may be projected from the casing against said closure means when the latter is in closed position to thus determine the exposed or usable portion of said contents, said closure means being adapted to swing into position down alongside the casing and substantially below the plane of the upper end of said casing when opened to provide full access to the exposed usable portion of the contents, and means on the exterior of the casing for controlling the closure means.

2. Apparatus according to claim 1 in which said controlling means comprises a sleeve slidable in the casing and said swinging closure means being operable to close and open the container as a consequence of sliding the sleeve to prescribed position along the container, said sleeve being independent of said closure means and in continuous frictional engagement therewith in moving the sleeve from withdrawn to advanced position to close the closure means.

3. In combination in a holder for a lipstick or the like, a tubular casing slidably receiving the lipstick therein, means for projecting said lipstick, hinged doors at the upper end of the casing and slidable sleeve means for controlling the doors solely by frictional bearing contact, said hinged doors when in closed position extending substantially above the upper end of the casing, to enclose the protruding end of the lipstick and to determine the proper extent to which the lipstick shall extend above the upper end of the casing, said doors being of cap or hood shape and hinged to the casing at opposite points, and forming when closed a substantial continuation of the casing closed at the upper end, and when open swinging down alongside the casing and substantially below the upper end of the casing to fully expose the usable protruding portion of the lipstick.

4. A lipstick holder according to claim 3 in which the doors are spring urged outwardly by springs mounted at the hinges.

In testimony whereof, I affix my signature.

LUCY COTTON AMENT.